Patented Nov. 4, 1941

2,261,922

UNITED STATES PATENT OFFICE 2,261,922

TREATMENT OF DISTILLERY SLOP

Ernest E. Pittman and Robert Roger Bottoms, Louisville, Ky., assignors to The Girdler Corporation, Louisville, Ky., a corporation of Delaware No Drawing. Application July 28, 1939, Serial No. 287,053

6 Claims. (Cl. 99—5)

This application is a continuation in part of our copending application Serial No. 210,163, filed May 26, 1938, relating to improvements in the treatment of distillery slop.

The present invention relates more particularly to an improved distillery slop treatment involving evaporation of the waste liquid of such slop. It has long been known that by the evaporation of such liquids coupled with the mechanical removal of suspended solids from the slop, a large recovery of grain may be secured, and at the same time the problem of disposal of the slop can be solved. However, there have been many disadvantages inherent in the heretofore employed conventional processes involving evaporation, among which may be mentioned the relatively high cost of fully adequate evaporator installation and maintenance; the necessity for providing for the absorption of the relatively large amount of evaporator sirup upon the relatively small amount of separated grain; the relatively high cost of drying the mixture of grain and sirup; and the necessity of frequent and laborious cleaning of the evaporators.

After the larger suspended solids are removed from the distillery slop coming from the still, the residual liquid commonly known as "thin slop" usually contains about 3% of total solids which percentage, however, may vary with the type of slop under treatment and the efficiency of the initial separation step. Contained within this thin slop will be found a certain percentage of small suspended solids together with a certain percentage of solids in solution within the slop liquid. The solids in solution may comprise certain unfermentable sugars, glycerine, soluble protein, organic acids such as lactic and succinic, gums, resins, and the like.

The presence of these materials interferes in a great measure with the efficiency of evaporators, and as the concentration of the same in the liquid being evaporated increases, they tend to foul evaporator surfaces and form a sticky heat insulating film on such surfaces. Furthermore, the high percentage of these solids in the concentrated liquid passing through the later stages of evaporation, limit in a large measure the degree to which concentration can be carried, with the result that comparatively large quantities of concentrated sirup are formed in the evaporators. If this sirup is to be used in its entirety for mixing with the separated grains, it is found that those grains normally will not have sufficient absorbing surface to take up all of this sirup. Reference to Geiger Patent No. 1,057,142 affords a recognition of this problem and indicates the nature of one solution which was attempted.

In addition to mixing quantities of extraneous material with the grain in order to solve this problem, it has also been proposed to recirculate through the drier a sufficient quantity of grain previously mixed with sirup in order to enable it to take up the surplus amount of sirup. Such an expedient obviously increases drier costs and entails the use of additional equipment.

This invention has as an object the provision of a process for reducing the amount of solids in the thin slop passing to evaporators and providing a greater amount of recovered solids suitable for absorbing evaporator sirup while simultaneously reducing the total quantity of evaporator sirup produced.

Another object is to provide a process whereby evaporators may operate more efficiently, may require less evaporator surface, may require less cleaning and attention, and may be made of a smaller size to accomplish a given task.

Another object is to improve the efficiency of drying of solids recovered from distillery slop.

Another object is to provide an improved final product derived from distillery slop.

Another object is to provide a thin slop of reduced total solids content by means of bentonite treatment.

Another object is to provide an improved agglomerate of distillery slop residues and bentonite having filter aid properties enabling the agglomerate to be removed from the liquid in a rapid and efficient manner.

Other objects and advantages will become more apparent as the disclosure proceeds.

It is proposed to apply the invention in such a way as to adapt it best to the particular equipment found in the particular distillery involved, and consequently the invention may be applied with respect to the treatment of thick slop, thin slop, or mixtures of the same.

Assuming that the thick slop from a distillery is to be treated, we mix colloidal bentonite therewith, either as a dry powder or as a slurry of bentonite and water, or as both. By colloidal bentonite, we mean bentonite which possesses the property of dispersing in water and forming a relatively stable colloidal suspension therein.

In those cases in which the grain is given only a coarse grinding, so that comparatively little protein goes into solution in the slop, dry bentonite alone, and in the ratio of about 15 pounds of bentonite to 1000 gallons of thick slop may be used, whereas in those cases in which a finely ground grain has been employed, a slurry of bentonite in water, having a ratio of one part dry bentonite to 15 parts by weight of water, may be mixed with the slop in the ratio of about 1 gallon of slurry to about 8 gallons of slop. It will be understood, of course, that variations in these ratios may be had without departing from the scope of the invention. Ordinarily, the amount of bentonite used is seldom less than 10 nor more than 60 pounds per 1,000 gallons of slop.

The colloidal bentonite, upon being mixed with the thick slop in its heated condition, forms an agglomerate with the larger suspended solids and the small colloidally suspended solids, and also forms a coagulum with certain of the soluble constituents. This agglomerate is then separated from the slop liquid in any suitable separatory apparatus such as centrifugals, filters, presses, screens, gravity separation clarifiers, or the like, after which the liquid effluent is directed to an evaporator, and the separated solids are directed toward a mixing station.

The evaporator is preferably a multi-effect one, and the evaporation is continued until the liquid becomes a thin sirup which is substantially free of suspended solids and dissolved protein previously removed from the slop in the bentonite treatment.

The solids separated after the bentonite treatment and sirup from the evaporator are mixed in any conventional mixing apparatus, and the mixture is then dried in any conventional drier. The solids from the bentonite treatment may be dried before adding the sirup, if desired, but this requires a second drying after the addition of the sirup.

The liquid separated after the bentonite treating step has a reduced total solids content in contrast with the usual solids content found in the thin slop heretofore obtained by any known commercial treatment. The clarified liquid of our process has a negligible proportion of colloidally suspended material, and a reduced amount of nitrogenous substances, gums and resins. Of particular importance is the fact that the liquid is substantially free of suspended solids since experience has shown that suspended solids interfere with efficient evaporation to a far greater extent than do the soluble solids contained in the liquid. It appears that the presence of the substantial amount of suspended solids found in the liquids resulting from known treating processes limits the degree to which concentration may be carried without caking the evaporator surfaces, whereas in our process the degree to which concentration may be carried is limited chiefly to the point at which the soluble solids coming out of solution begin to cake on such surfaces.

The production of this relatively clear effluent makes possible remarkable advantages in the evaporation step of the process. The solids in the effluents formerly obtained exerted an inhibiting action on the evaporation of the moisture, required large quantities of evaporator heat, and resulted in the production of large quantities of sirup containing low solids content. Our process enables the distiller to obtain a very much smaller total quantity of sirup of high solids content, and at far less expense.

The presence of the comparatively small amount of bentonite material, plus the additional amount of solids removed by the use of bentonite plus the amount of coarse solids which are always removed by the initial separation treatment, results in the production of a larger amount of solid material available for absorbing the sirup coming from the evaporators. Therefore, our process makes it possible for the operator to mix all of the evaporator sirup with the solids derived from the separation step, and avoids the necessity for using extraneous bulking material, although in our process some of the dried grain may be recirculated to increase the sirup absorbing surface and speed up the drying, if desired.

In those instances wherein the invention is used in a distillery having equipment for screening out coarse solid from the thick slop to form a thin slop, the colloidal bentonite may be added to the thin slop so obtained. In such cases the agglomerate resulting from the bentonite treatment of the thin slop may be passed through any suitable secondary separating apparatus as for example, a filter press. It has been found that the agglomerate of colloidal bentonite and solids derived from distillery slop possesses a remarkable filter aid property. The filtration of untreated distillery slop has heretofore been impossible due to the rapid coating of filter surfaces with the colloidally suspended particles of the slop, but in our process the agglomerate including the bentonite, acts as a filter surface and will not clog the filtering surfaces of the filtering apparatus.

In carrying out the invention in this way, the effluent of the thin slop coming from the secondary filtering apparatus has a reduced total solids content as above indicated, and may be passed directly into the evaporators. The solids separated from this thin slop in the secondary separating apparatus preferably are mixed with the solids separated in the initial separating or screening step. The evaporator sirup resulting from the evaporation of the bentonite treated thin slop may be mixed with either or both these two grades of separated solids, and before, after, or during the mixing and the entire mixture or the separate two grades of separated solids may be passed through the drying stage.

As will be apparent from the foregoing the many advantages of our invention result from the treatment of the slop material with colloidal bentonite. Almost every distillery prides itself upon its particular grinding formula and its own special conditions of operation, and therefore, it will be evident that different slops may require treatment in accordance with their own individual characteristics. The amount of bentonite to be used will depend to some extent upon the particular slop being treated, for example, that obtained from molasses or rye, corn, or other grains. We have found that in certain types of slop the addition of a small percentage of lime is advantageous in facilitating separation of solids, and in some cases permits a reduction in the amount of bentonite required.

In certain instances wherein it is desired to effect the separation of the thin slop from the colloidal bentonite agglomerate by means of decantation or sedimentation, it may be desirable to add a certain amount of non-colloidal material to produce a more rapid settling of the agglomerate. In such cases, a non-colloidal material such as fuller's earth or the like may be added to the treated slop to give an increased settling rate of the agglomerate.

Other variations of the bentonite treatment may be practiced for treatment of slop having particular unusual characteristics, without departing from the invention.

Having thus described our invention, what we claim as new and desire to secure by Letters Patent is:

1. The process of disposing of distillery slop including treating the slop with colloidal bentonite, said bentonite being capable of dispersion in water and forming a relatively stable colloidal suspension therein, and said slop containing a sufficient quantity of colloidally suspended solids to coagulate said suspension of colloidal bentonite, to thereby form a separable agglomerate and a liquid having a total solids content of not more than 2.5% and substantially free of suspended solids, separating the agglomerate from the clarified liquid, evaporating moisture from the liquid to form a relatively small volume of highly concentrated sirup, and utilizing the sirup and agglomerate.

2. The process of producing feed from distillery slop which includes screening the thick slop to separate the coarser solids and to form a thin slop, treating the thin slop with colloidal bentonite, said bentonite being capable of dispersion in water and forming a relatively stable colloidal suspension therein, and said slop containing a sufficient quantity of colloidally suspended solids to coagulate said suspension of colloidal bentonite, to thereby form a separable agglomerate and a liquid substantially free of suspended solids, evaporating the liquid to form a relatively small volume of highly concentrated sirup, mixing the sirup and separated solids and drying the mixture to form a feed.

3. The process of producing feed from distillery slop which includes treating the slop with colloidal bentonite in the presence of lime, said bentonite being capable of dispersion in water and forming a relatively stable colloidal suspension therein, and said slop containing a sufficient quantity of colloidally suspended solids to coagulate said suspension of colloidal bentonite, to thereby form a separable agglomerate and a liquid, separating the agglomerated solids to leave the liquid substantially free of suspended solids, evaporating the liquid to form a relatively small volume of highly concentrated sirup, mixing the sirup and separated solids, and drying the mixture to form a feed.

4. The process of recovering feed from distillery slop which includes treating the slop in a heated condition with colloidal bentonite, said bentonite being capable of dispersion in water and forming a relatively stable colloidal suspension therein, and said slop containing a sufficient quantity of colloidally suspended solids to coagulate said suspension of colloidal bentonite, to thereby form a separable agglomerate and a liquid, separating the agglomerated solids to leave the liquid substantially free of suspended solids, evaporating the liquid to form a relatively small volume of highly concentrated sirup, mixing the sirup and separated solids, and drying the mixture to form a feed.

5. The process of producing feed from distillery slop containing a sufficient quantity of colloids to coagulate a stable suspension of colloidal bentonite, which includes treating the slop with bentonite capable of dispersion in water and forming a relatively stable colloidal suspension therein, to thereby form a separable agglomerate and a relatively large volume of liquid, separating the agglomerated solids to leave the liquid with a total solids content of not more than 2.5% and substantially free of suspended solids, evaporating the large volume of liquid to form a highly concentrated sirup, the volume of which is relatively small for mixing said sirup with the solids separated from the original slop without addition of extraneous bulking material, and drying the mixture to form a feed.

6. The process of recovering feed from distillery slop containing a sufficient quantity of colloids to coagulate a stable suspension of colloidal bentonite, which includes treating the thick slop with bentonite capable of dispersion in water and forming a relatively stable colloidal suspension therein, to thereby form a separable agglomerate of the suspended solids and the colloidal matter adsorbed by the bentonite together with a relatively large volume of liquid, separating the agglomerate to leave the liquid with a total solids content of not more than 2.5% and substantially free of suspended solids, evaporating a large volume of such liquid to form a relatively small volume of highly concentrated sirup sufficiently small for mixing with the solids separated from the thick slop without addition of extraneous bulking material, mixing the sirup with the solids and drying the mixture to form a feed.

ERNEST E. PITTMAN.
ROBERT ROGER BOTTOMS.